US008434706B2

(12) United States Patent
Davis

(10) Patent No.: US 8,434,706 B2

(45) Date of Patent: May 7, 2013

(54) OVERBURDEN REMOVAL SYSTEM WITH TRIPLE TRACK MOBILE SIZER

(75) Inventor: Glenn Irl Davis, Spokane, WA (US)

(73) Assignee: FLSmidth A/S (DK)

( * ) Notice: Subject to any disclaimer, the term of this patent is extended or adjusted under 35 U.S.C. 154(b) by 319 days.

(21) Appl. No.: 12/921,581

(22) PCT Filed: Mar. 6, 2009

(86) PCT No.: PCT/US2009/001453

§ 371 (c)(1), (2), (4) Date: Sep. 9, 2010

(87) PCT Pub. No.: WO2009/114106

PCT Pub. Date: Sep. 17, 2009

(65) Prior Publication Data

US 2011/0000992 A1 Jan. 6, 2011

Related U.S. Application Data

(60) Provisional application No. 61/068,923, filed on Mar. 12, 2008.

(51) Int. Cl.
*B02C 21/02* (2006.01)
*B65G 15/26* (2006.01)

(52) U.S. Cl.
USPC .................................. 241/101.74; 198/313

(58) Field of Classification Search .................. 198/613; 241/101.74
See application file for complete search history.

(56) References Cited

U.S. PATENT DOCUMENTS

| | | | |
|---|---|---|---|
| 4,953,915 | A | 9/1990 | Jasser et al. |
| 5,234,094 | A | 8/1993 | Weyermann et al. |
| 6,360,876 | B1 | 3/2002 | Nohl et al. |
| 6,869,147 | B2 | 3/2005 | Drake et al. |
| 7,013,937 | B2 | 3/2006 | Potts |

*Primary Examiner* — Mark Rosenbaum

(74) *Attorney, Agent, or Firm* — Daniel DeJoseph; Aaron M. Pile; Jeffrey A. Sharp

(57) ABSTRACT

An overburden removal system receives, comminutes and transports excavated material. Two laterally spaced apart pivotal crawler track assemblies (21) (21*a*) and rearwardly spaced crawler track assembly (22) provide for advancement using serpentine turns. Two opposing feed assemblies (24) (25) each have a feed hopper (67) (76) and an elongately movable feed conveyor (69) (77) for feeding a medial rock crusher (23) carrying two parallel oppositely rotatable rock crushing drums (59). Discharge conveyor (38) carries comminuted material from rock crusher (23) to telescoping conveyor (27) pivotally attached to rearward edge (35) of mobile sizer (19) for transfer to a mobile hopper (28) supported by bridge conveyor (29) operatively communicating with a movable conveyor (105). Automated control system (30) using GPS technology controls movement of mobile sizer (19), telescoping conveyor (27) and bridge conveyor (29) to maintain a continuously operative interconnection therebetween while moving and while stationary for continuous operation.

11 Claims, 14 Drawing Sheets

OVERBURDEN REMOVAL SYSTEM WITH TRIPLE TRACK MOBILE SIZER

RELATED APPLICATIONS

This Application claims the benefit of earlier filed U.S. Provisional Patent Application No. 61/068,923 filed on Mar. 12, 2008 in the United States Patent and Trademark Office. Said Application is expressly incorporated herein, in its entirety, by this reference. This Application further claims the benefit of earlier filed PCT application no. PCT/US09/01453 filed on 6 Mar. 2009.

TECHNICAL FIELD

This invention relates to earth moving equipment, solid material comminution and disintegration, and more particularly to a mobile rock crusher and overburden removal system for receiving, comminuting, transporting and re-depositing excavated overburden material at an open pit mine.

BACKGROUND ART

Where valuable minerals exist in subsurface ore beds it is necessary to remove the overburden material before the ore may be mined. Because overburden removal increases costs, removal must be as efficient as possible.

Various apparatus and methods for removing overburden are known and generally comprise a semi-permanent rock crusher interconnected to conveyor systems for transporting crushed overburden material to a spoil site distal from the excavation site. Overburden is excavated from a mine face using machines such as mechanical shovels. Blasting may precede excavation. When the distance between the mine face and rock crusher is not great, the excavated overburden is deposited directly into the rock crusher by the excavating machines. However, as the mine face advances due to excavation, the distance the excavated overburden material must be transported to the rock crusher increases which requires the excavating machines traverse back and forth between the mine face and the rock crusher. Alternatively, transport vehicles such as dump trucks may be used to traverse the distance. Unfortunately, as the distance increases, efficiency decreases. To address this problem, additional transport vehicles may be employed or the rock crusher may be shut down, disassembled and moved to a position closer to the mine face and then reassembled. Shutting down a rock crusher so that it may be moved materially adds to the amount of unavoidable down time caused by foreseeable repair and maintenance. Such additional "down time" further increases costs and may make a project not economically viable.

Overburden normally consists of a layer of fertile top soil over one or more layers of rocks and the like. Modern reclamation practices encourage segregation and separate handling of the topsoil layer so that it may be replaced atop the excavated overburden material when the land is reclaimed. Unfortunately, segregation of the topsoil can be prohibitively expensive.

There is a need to increase the efficiency of overburden removal, without incurring additional costs of transport equipment and without additional downtime caused by shutting down, disassembling, moving and reassembling a rock crusher. There is also a need to reduce the cost of mine site reclamation and top soil segregation.

My invention resolves various of the aforementioned problems by providing a self-propelled, mobile sizer having an integral rock crusher and interconnected mobile conveyors for receiving, comminuting and transporting overburden material, and for depositing the overburden material at a spoil site.

My overburden removal system having a triple track mobile sizer is movable under load, follows the excavating machines as the mine face advances and remains continuously interconnected to mobile conveyor systems for transporting the excavated and crushed overburden material to the spoil site.

My system does not need to be shut down and disassembled to be moved, and is structurally configured to minimize shovel cycle times. Further, my overburden removal system and its interconnected mobile conveyors facilitate segregation of the fertile topsoil from subsurface overburden material making mine site reclamation efficient and more effective.

My invention does not reside in any one of the identified features individually but rather in the synergistic combination of all of its structures, which give rise to the functions necessarily flowing therefrom as hereinafter specified and claimed.

DISCLOSURE OF THE INVENTION

A self-propelled overburden removal system having triple track mobile sizer receives, comminutes and transports excavated overburden material. Plural spaced apart crawler track assemblies provide for advancing travel using serpentine turns. Two opposing feed assemblies each having a feed hopper and an elongately movable feed conveyor feed a medial rock crusher carrying two parallel oppositely rotatable rock crushing drums. Discharge conveyor carries comminuted material from rock crusher to telescoping conveyor pivotally attached to rearward edge of sizer for transfer to a mobile hopper supported by a bridge conveyor operatively communicating with a movable conveyor system. Automated control system using GPS technology controls movement of the mobile sizer, the telescoping conveyor and the bridge conveyor to maintain a continuously operative interconnection therebetween while moving and while stationary for continuous operation.

In providing such an apparatus it is:

a principal object to provide a overburden removal system having a triple track mobile sizer that increases the efficiency of overburden removal.

a further object to provide such an overburden removal system that advances and retreats using serpentine turns.

a further object to provide such an overburden removal system having two laterally spaced pivotal crawler track assemblies and a rearwardly spaced crawler track assembly for movement, for steering and for stability.

a further object to provide such a an overburden removal system that is operable while moving.

a further object to provide such an overburden removal system having opposing elongately movable feed conveyors to regulate the size of crusher input orifice.

a further object to provide such an overburden removal system having a control system that advances the mobile sizer using serpentine turns and simultaneously causes interconnected telescoping conveyor, and interconnected bridge conveyor to maintain continuous operative interconnection with the mobile sizer and a conveyor system as the mobile sizer and overburden removal system advances.

a further object to provide such an overburden removal system wherein the feed hoppers are lowered to reduce the height a shovel must lift overburden material, to increase shovel efficiency and to reduce shovel cycle time.

a further object to provide such an overburden removal system having a feed hopper at each end portion providing a larger area for shovel operation and minimizing the frequency of sizer movement and shovel movement.

a further object to provide such an overburden removal system having a telescoping conveyor operatively communicating between discharge conveyor and mobile hopper carried by a bridge conveyor.

a further object to provide such an overburden removal system having a telescoping conveyor that extends and contracts responsive to movement of the mobile sizer and to movement of the bridge conveyor to maintain a continuous operative connection between the mobile sizer and the mobile hopper.

a further object to provide such an overburden removal system having a bridge conveyor that moves responsive to movement of the mobile sizer maintaining a continuous operative connection with the telescoping conveyor and with mobile sizer.

a further object to provide such an overburden removal system having a roller table operatively interconnecting end portion of the telescoping conveyor and the mobile hopper a further object to provide such an overburden removal system that uses sensors on the roller table to provide data to the control system to maintain an operative interconnection between the telescoping conveyor and the mobile hopper to accommodate limited free movement therebetween.

Other and further objects of my invention will appear from the following specification and accompanying drawings which form a part hereof. In carrying out the objects of my invention it is to be understood that its structures and features are susceptible to change in design and arrangement with only one preferred and practical embodiment of the best known mode being illustrated in the accompanying drawings and specified as is required.

BRIEF DESCRIPTIONS OF DRAWINGS

In the accompanying drawings which form a part hereof and wherein like numbers refer to similar parts throughout:

FIG. 3 is an orthographic cross section view similar to that of

Figure 1:
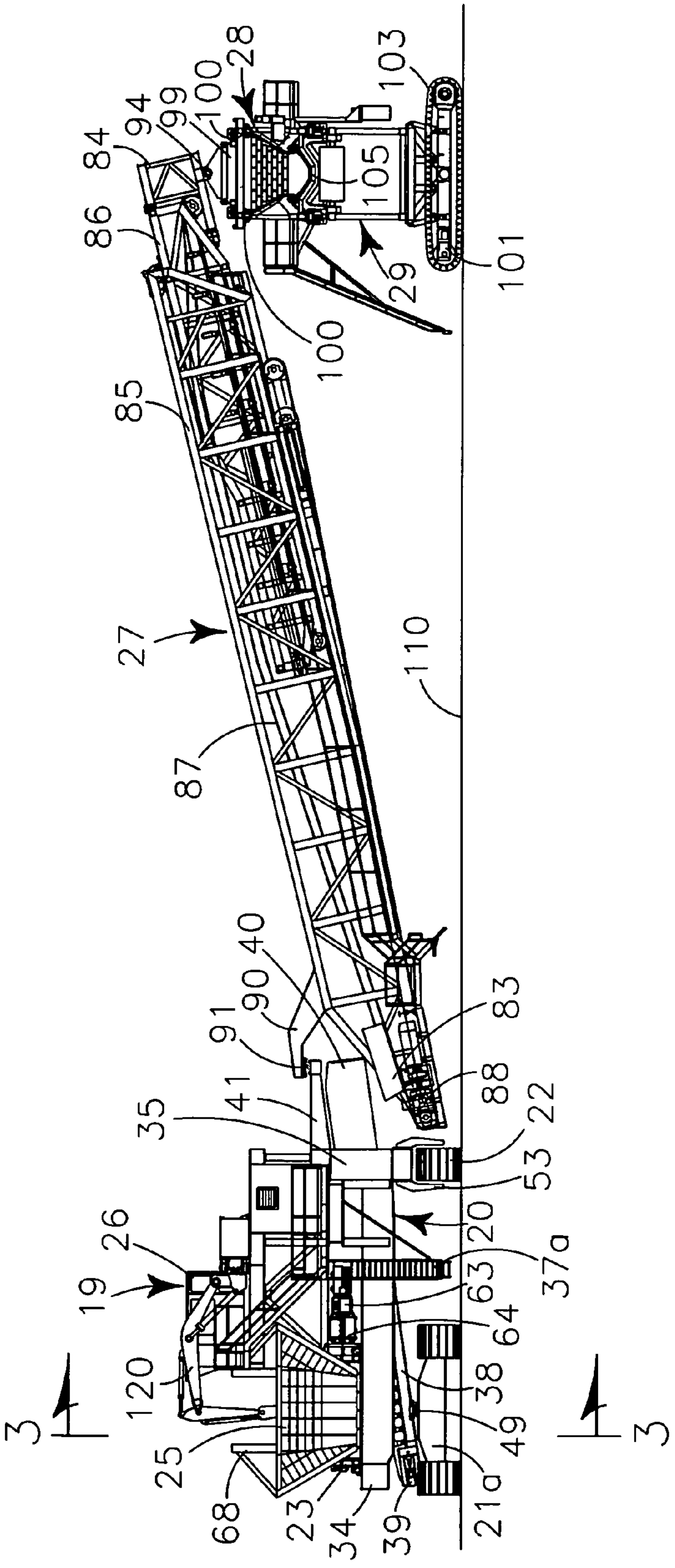
FIG. 1 is an orthographic side view of the overburden removal system showing the triple track mobile sizer, the telescoping conveyor, the mobile hopper and the bridge conveyor showing operational arrangement of the components.
Figure 2:
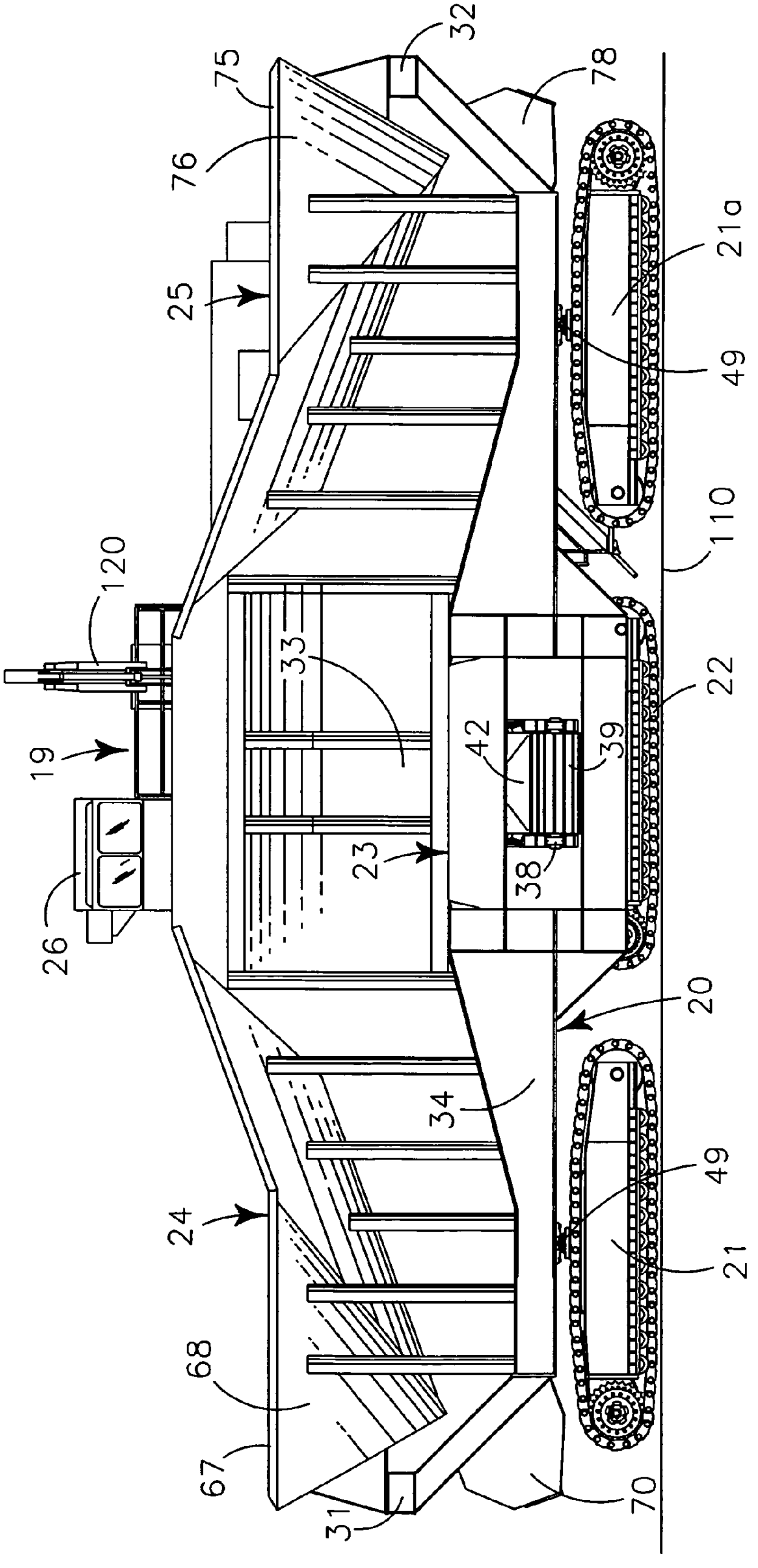
FIG. 2 is an orthographic front view of the triple track mobile sizer.

FIG. 2 taken on line 3-3 of FIG. 1.

Figure 4:
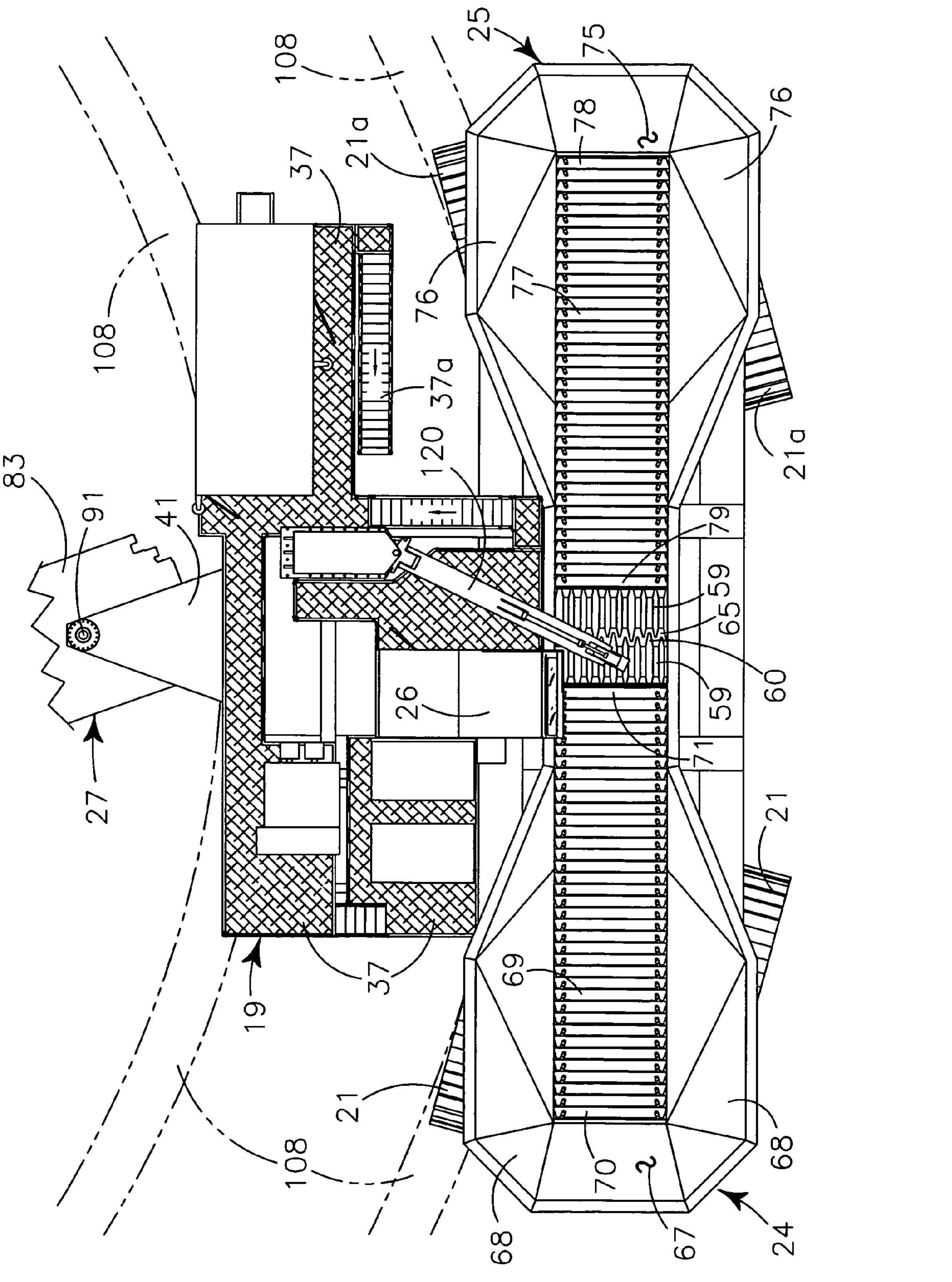

FIG. 4 is a plan view of the triple track mobile sizer.

Figure 5:
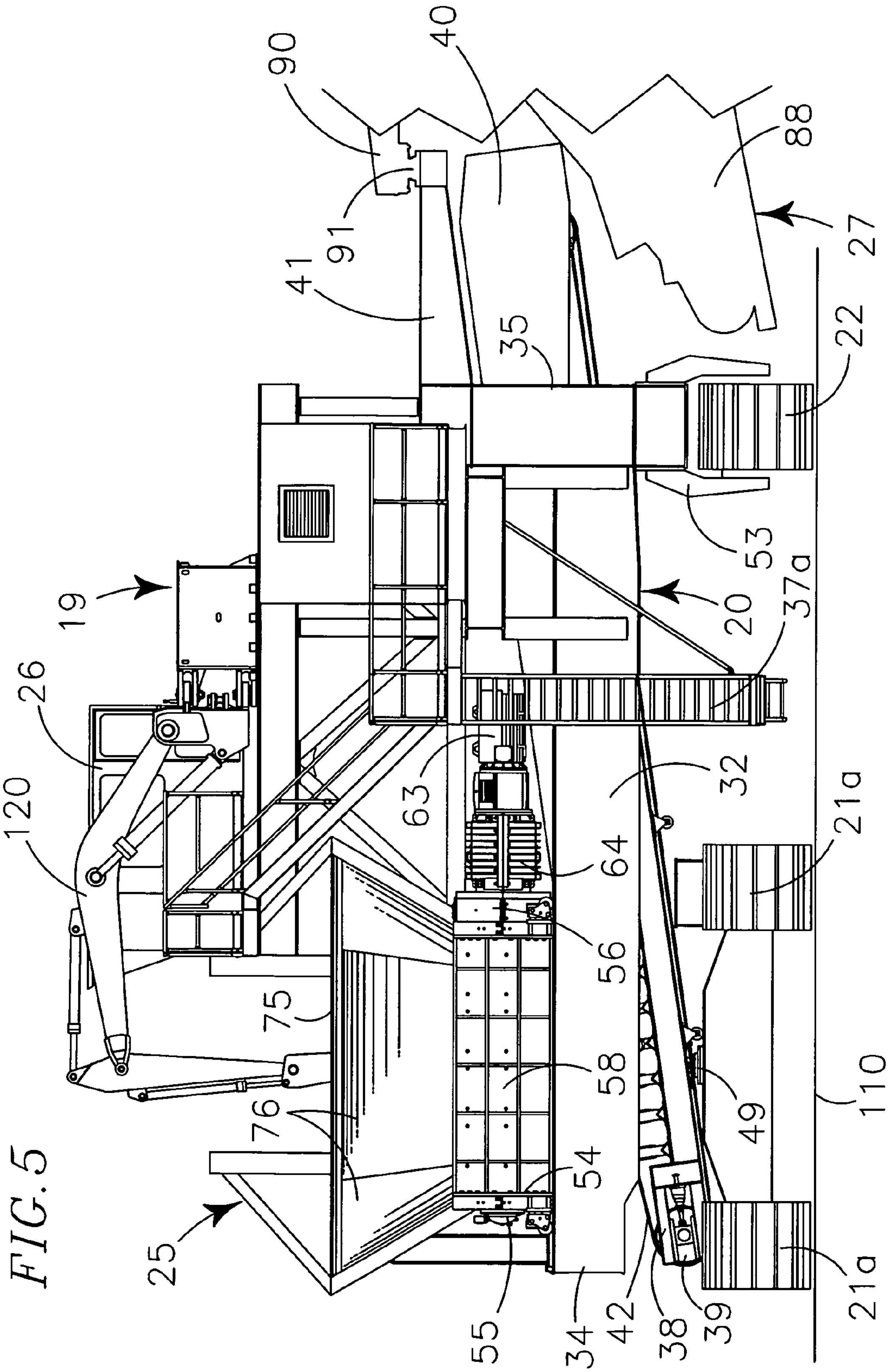

FIG. 5 is an enlarged orthographic side view of the triple track mobile sizer.

Figure 6:
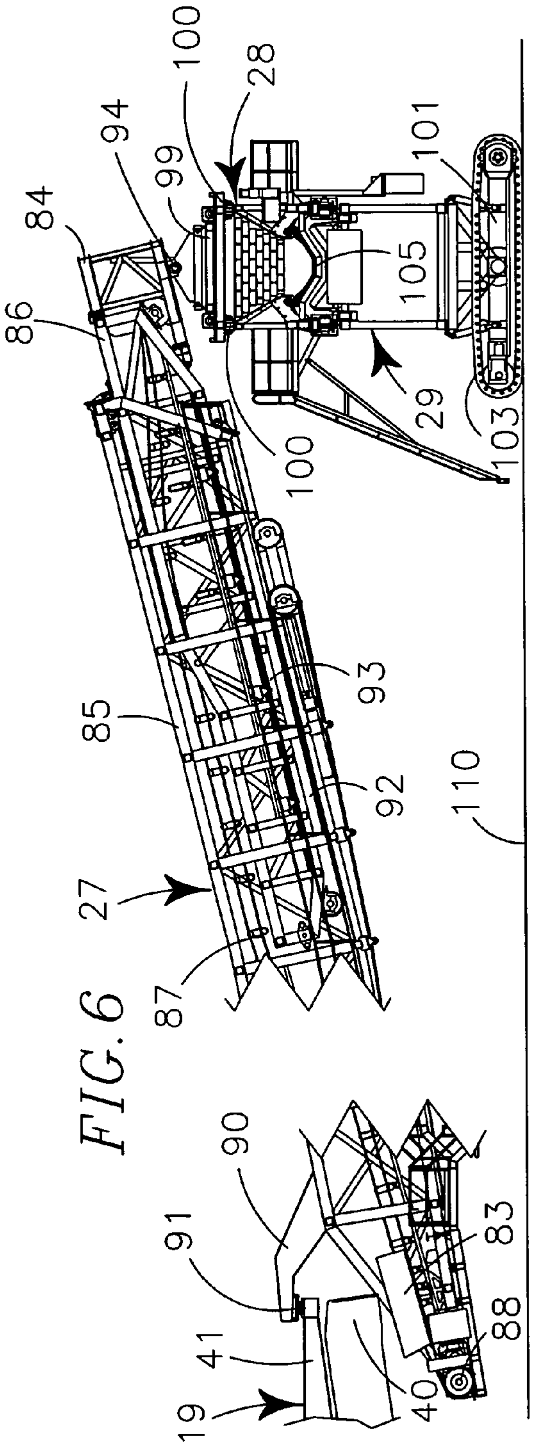

FIG. 6 is an enlarged, partial cut-away orthographic side view of the telescoping conveyor in a retracted configuration communicating between the mobile sizer and the mobile hopper carried by the bridge conveyor.

Figure 7:
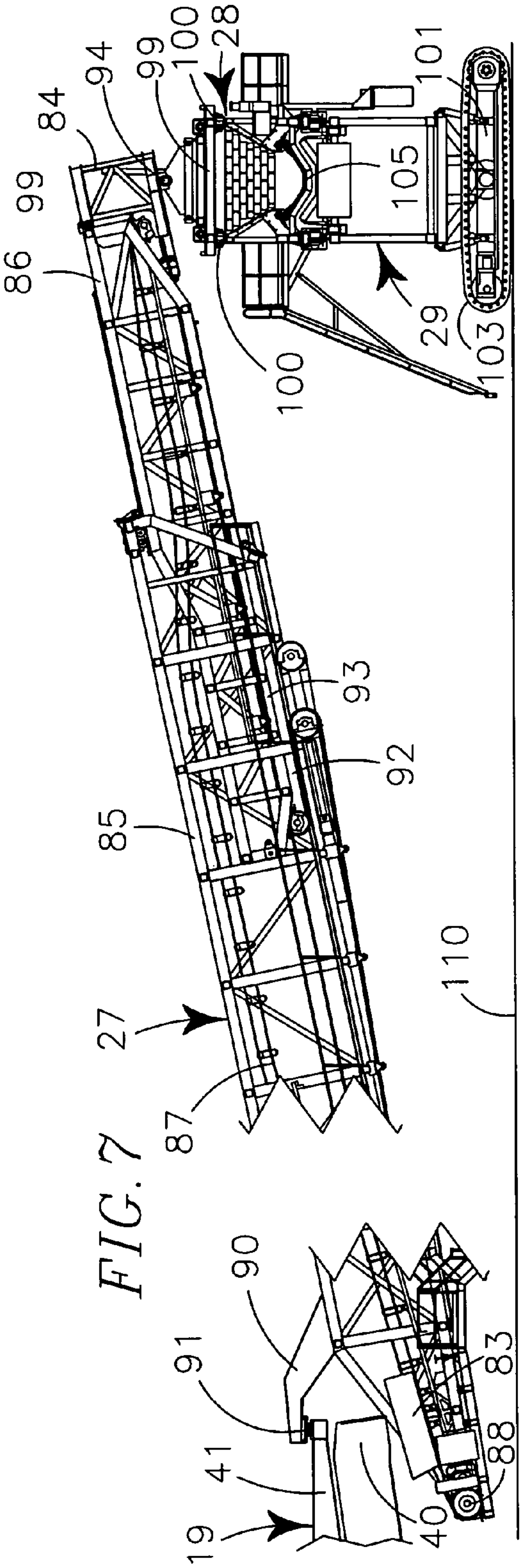

FIG. 7 is an enlarged, partial cut-away orthographic side view, similar to that of FIG. 6 showing the telescoping conveyor in a partially extended configuration.

Figure 8:
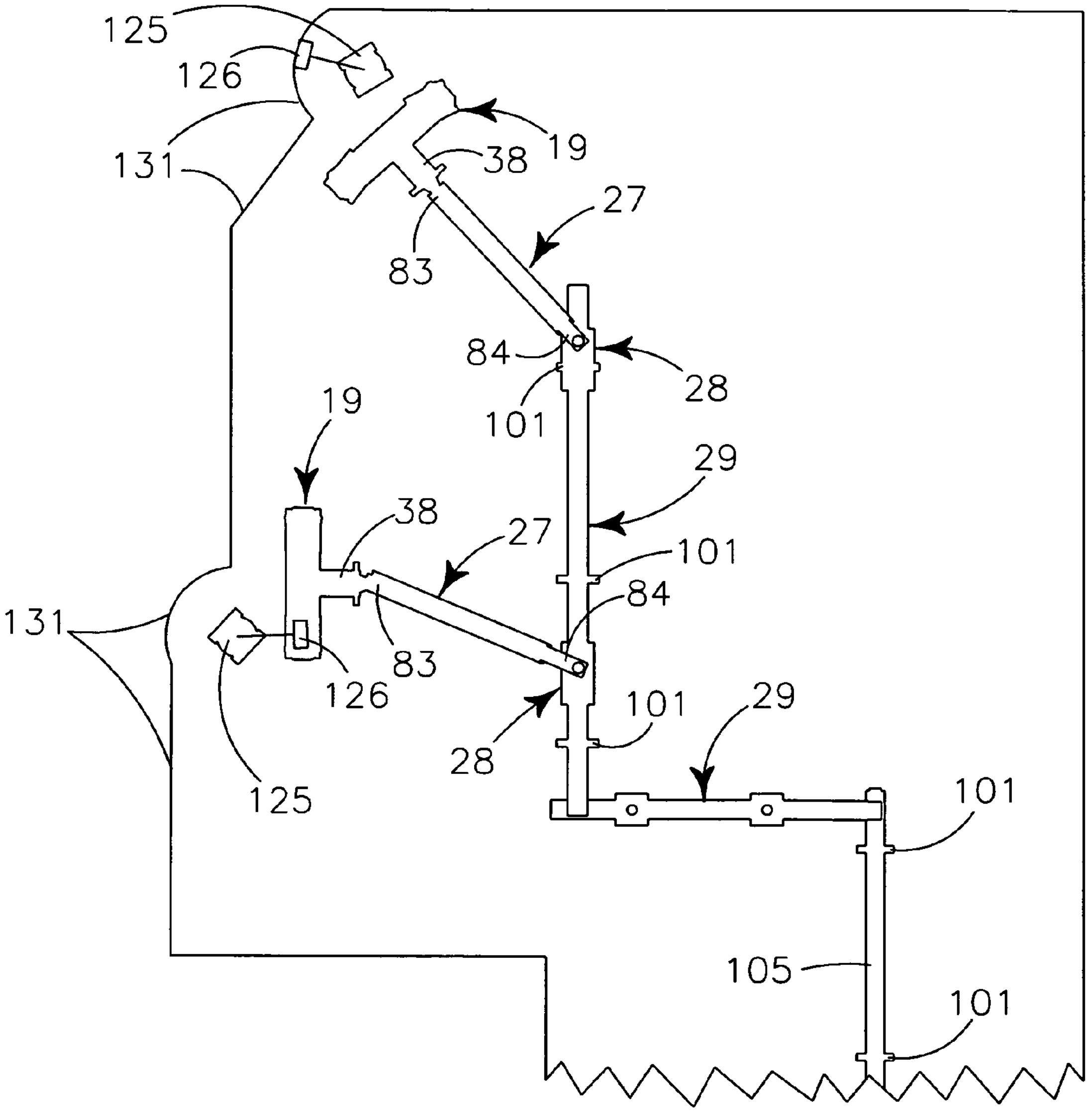

FIG. 8 is a diagrammatic plan view of two shovels and two triple track mobile sizers, telescoping conveyors and bridge conveyors interconnected to a conveyor system proximate to a mine face in an open pit mine.

Figure 9:
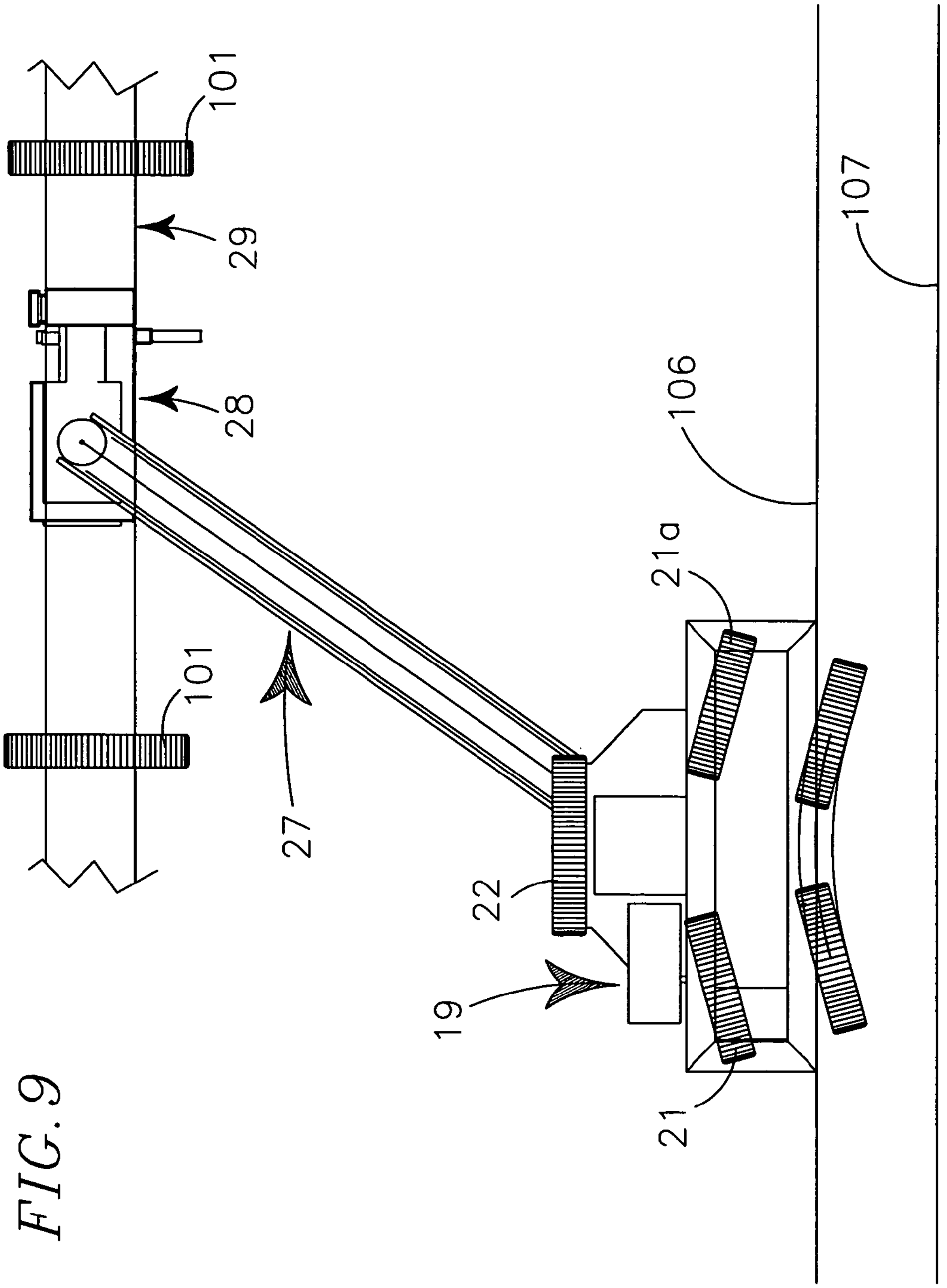

FIG. 9 is a diagrammatic plan view of the overburden removal system with the mobile sizer skewing the dual crawler track assemblies in a first direction to commence a serpentine turn for forward advancement.

Figure 10:
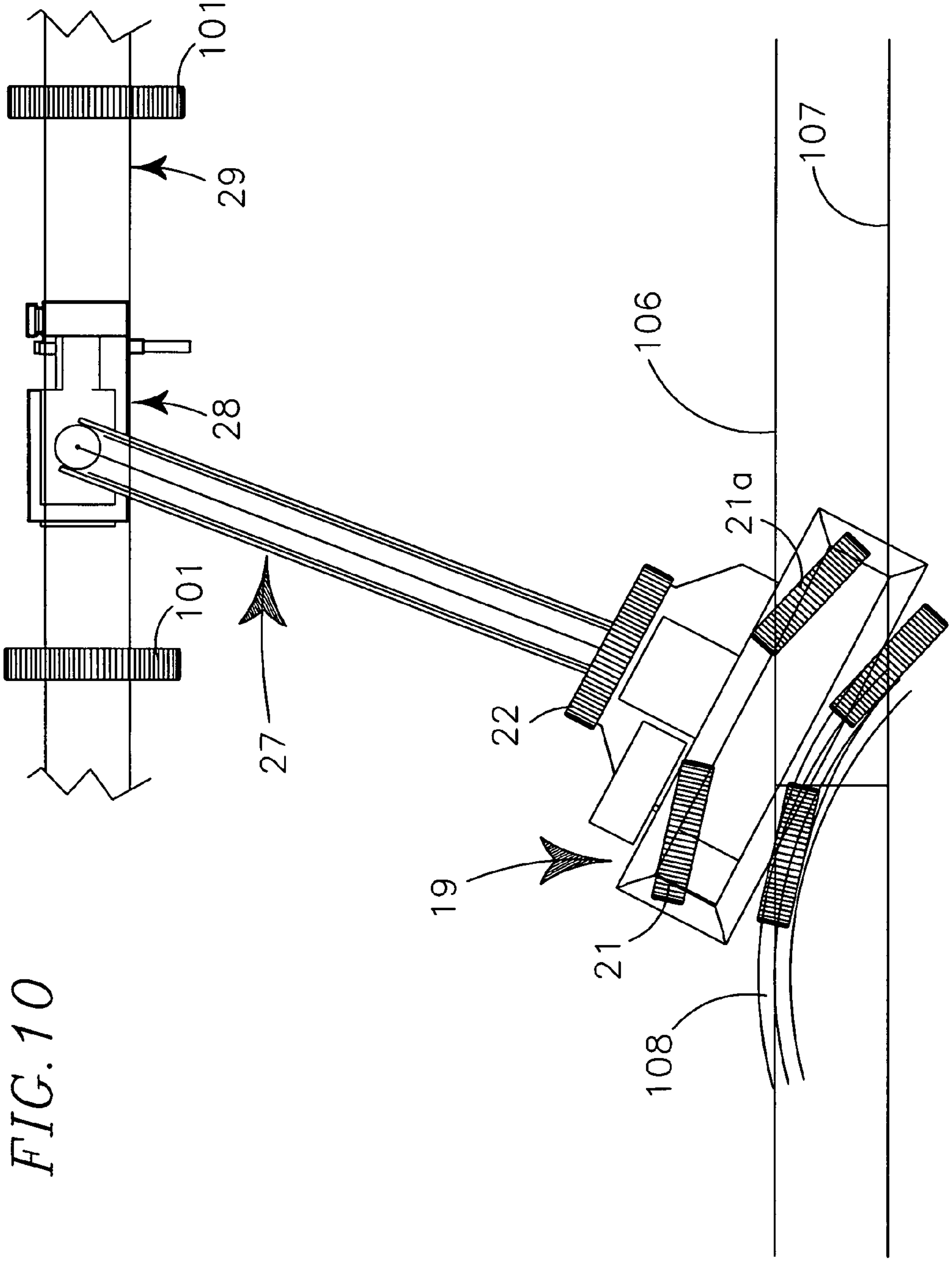

FIG. 10 is a diagrammatic plan view of the overburden removal system with the mobile sizer initiating first half of a serpentine turn for forward advancement.

Figure 11:
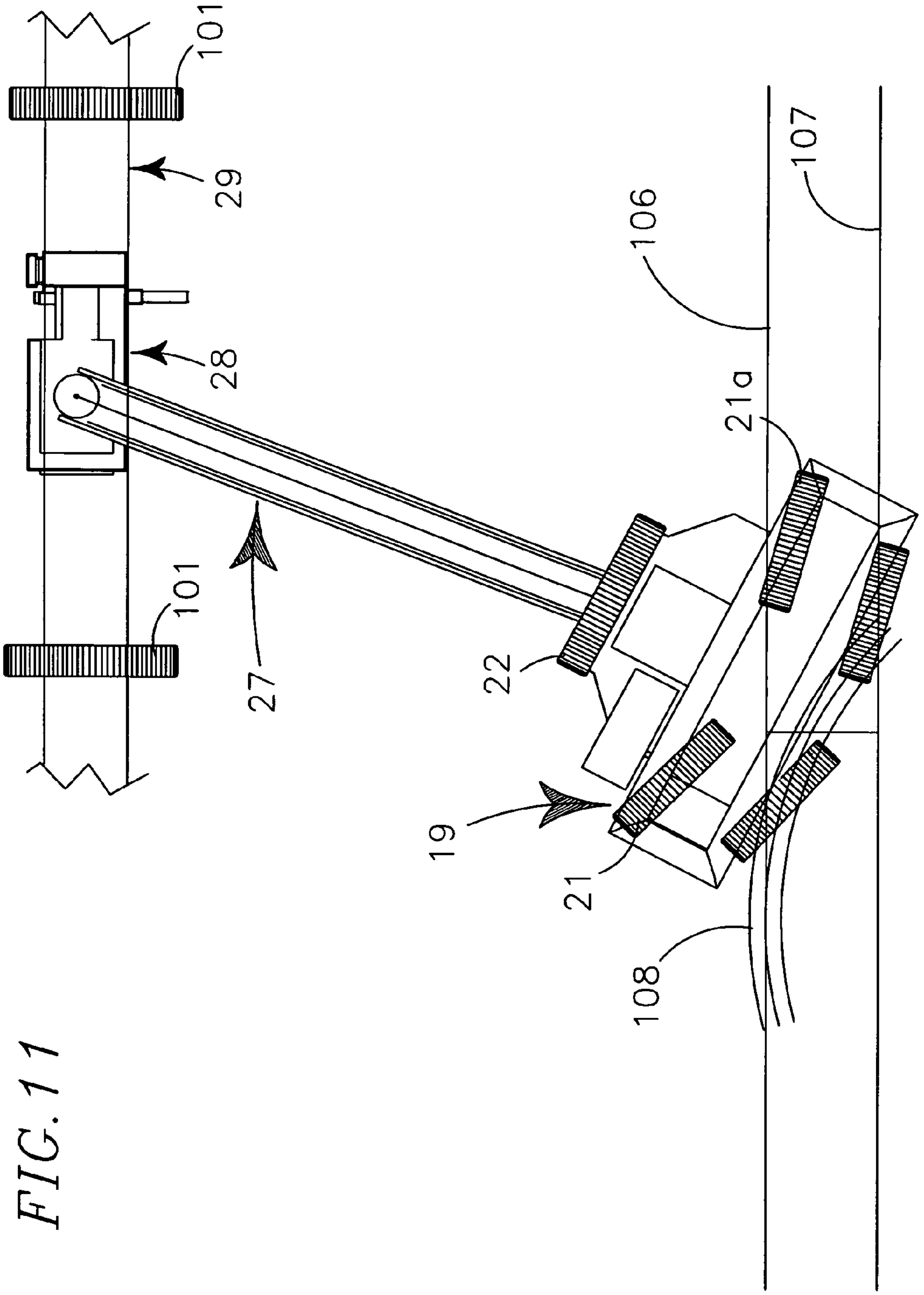

FIG. 11 is a diagrammatic plan view of the overburden removal system with the mobile sizer skewing the dual crawler track assemblies in a second direction after completing the first half of the serpentine turn.

Figure 12:
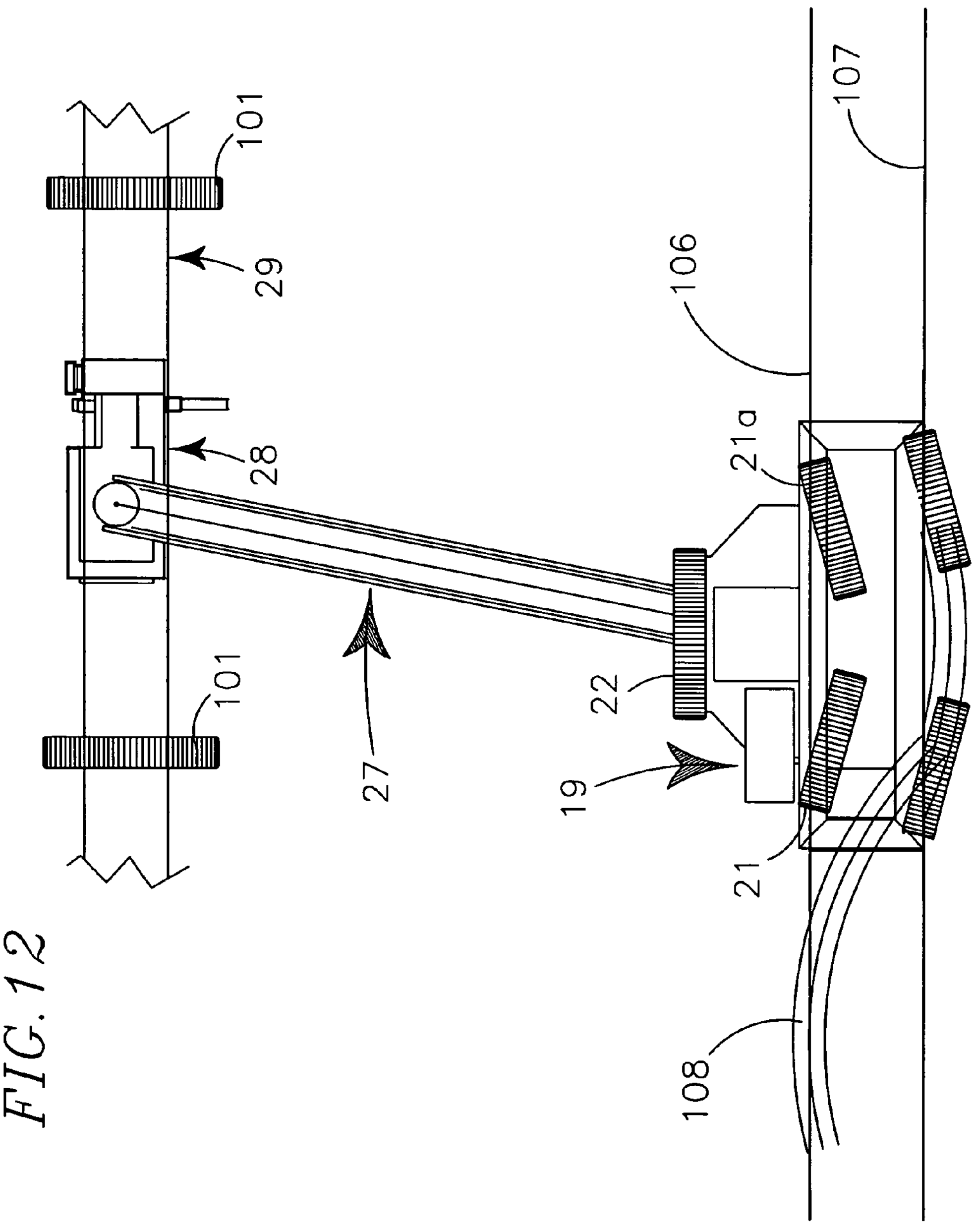

FIG. 12 is a diagrammatic plan view of the overburden removal system with the mobile sizer initiating second half of a serpentine turn for forward advancement.

Figure 13:
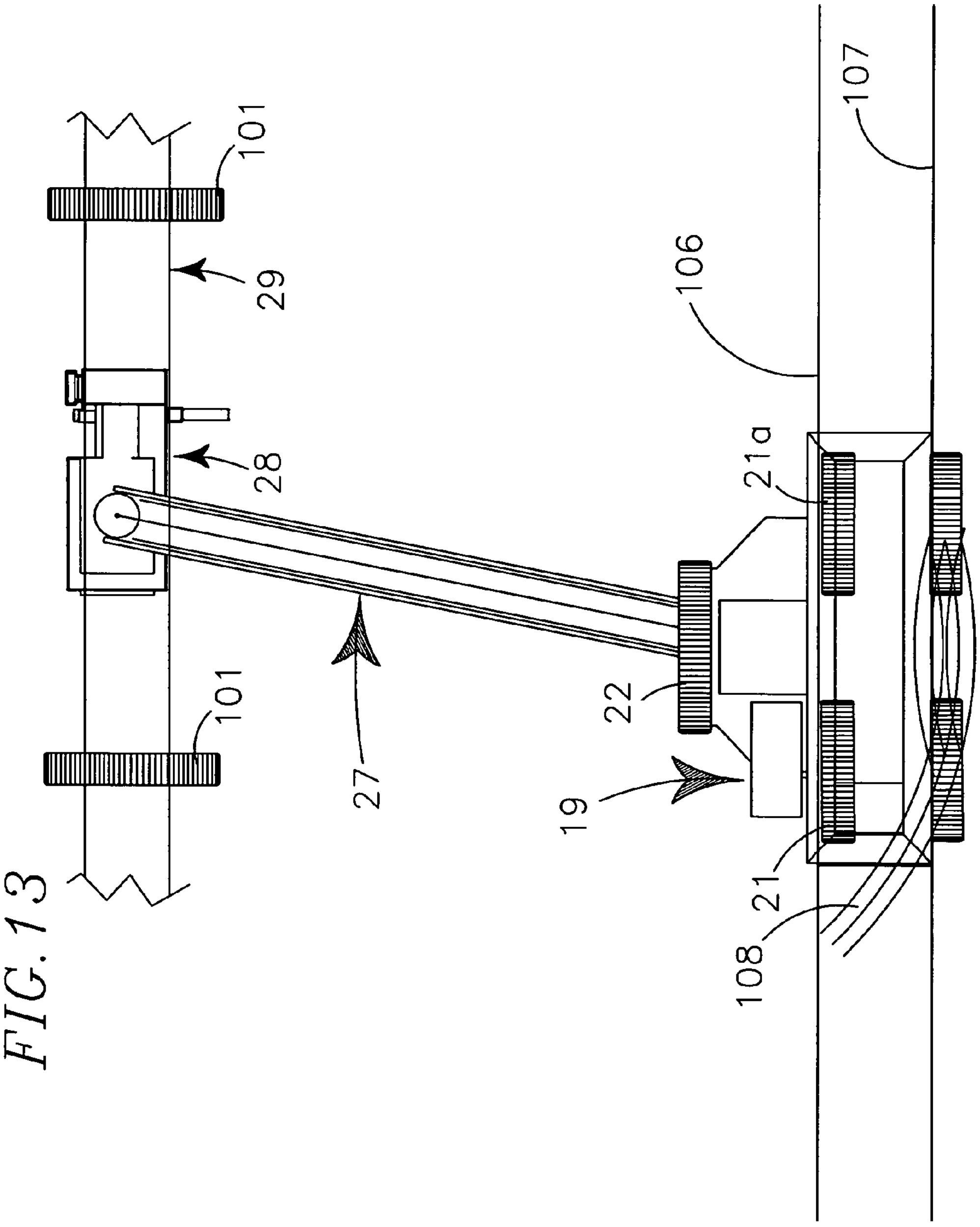

FIG. 13 is a diagrammatic plan view of the overburden removal system with the mobile sizer skewing the dual crawler track assemblies parallel to the third crawler track.

Figure 14:
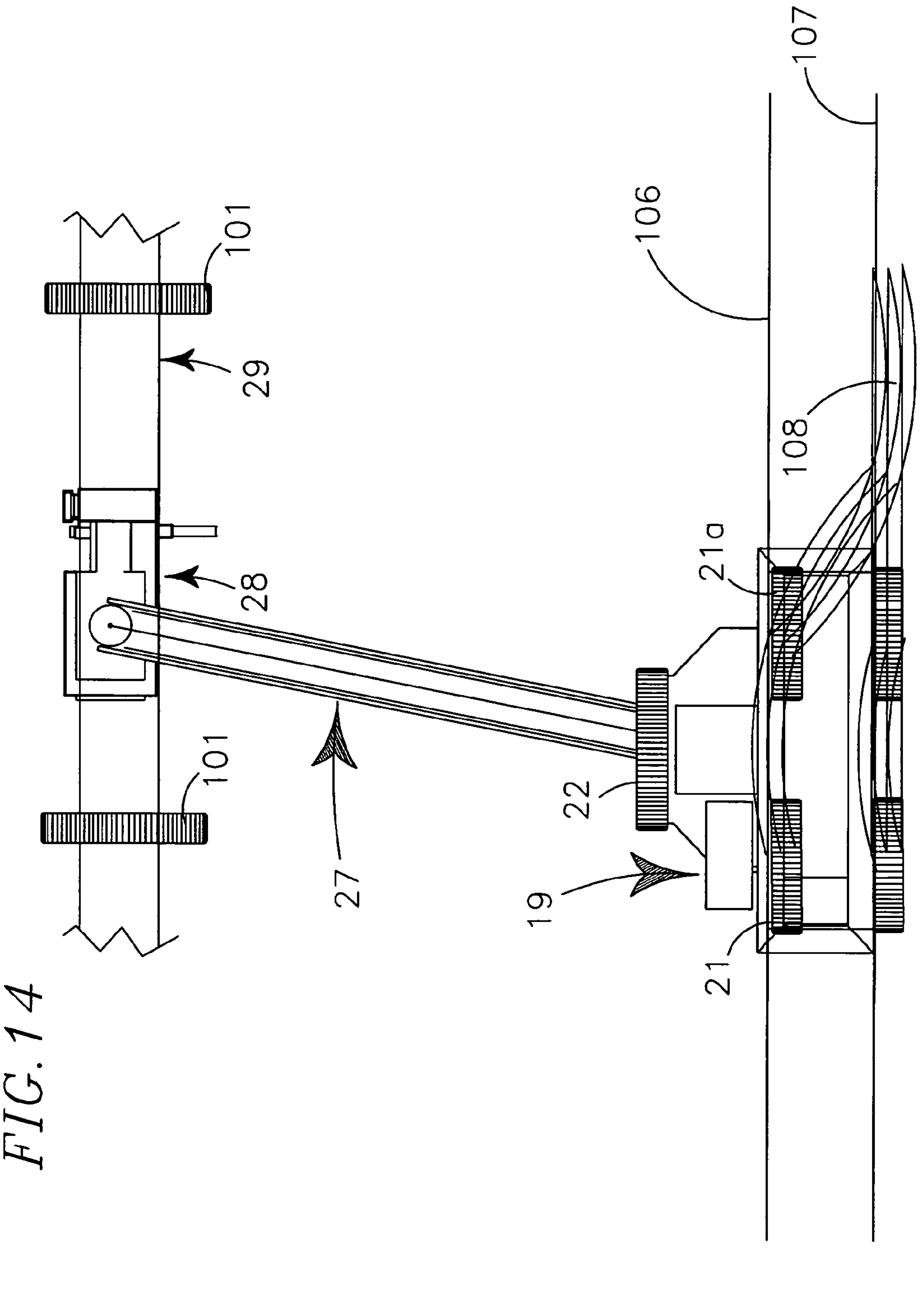

FIG. 14 is a diagrammatic plan view of the overburden removal system with the mobile sizer having completed a serpentine turn and having advanced forwardly.

Figure 15:
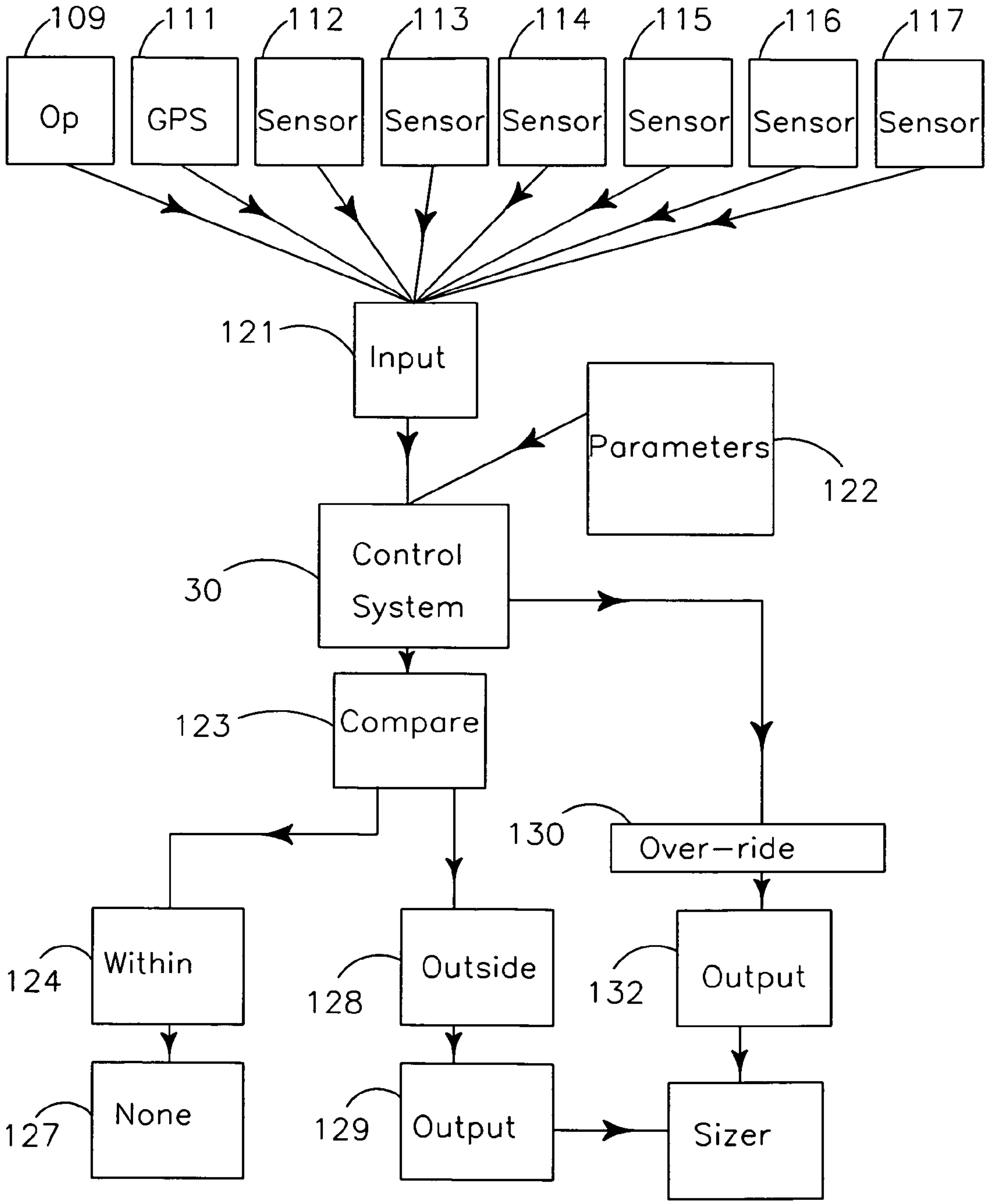

FIG. 15 is a flow chart of the control system functions.

BEST MODE FOR CARRYING OUT THE INVENTION

As used herein, the term “front”, its derivatives, and grammatical equivalents refers to the portion of my overburden removal system with triple track mobile input, sizer and transport mechanism that is opposite telescoping conveyor 27. The term “back”, its derivatives, and grammatical equivalents refers to the portion of my overburden removal system with triple track mobile input, sizer and transport mechanism that is proximate telescoping conveyor 27. The term “outer”, its derivatives, and grammatical equivalents refers to a side portion of my overburden removal system with triple track mobile input, sizer and transport mechanism as opposed to a laterally medial portion. The term “shovel” is given its common definition in the open pit mining trade and without limitation may generally be defined as a self-propelled mobile vehicle that excavates and lifts material from the mine face and deposits the material into a transport vehicle or rock crusher. A shovel typically has a body with a movable shovel arm carrying a bucket at its outer end portion. The body may be supported on a crawler track assembly and is pivotal relative to the crawler track assembly about a vertical axis. The term “cycle time” is defined as the amount of time required for a shovel to fill the bucket with material, transport the material to a deposit site, deposit the material, and return to a position to refill the bucket.

My overburden removal system with triple track mobile sizer generally provides a control system 30 and a self-propelled mobile sizer 19 interconnected to telescoping conveyor 27 operatively communicating with a mobile hopper 28 and a bridge conveyor 29.

The mobile sizer 19 comprises a body 20 having a forward edge portion 34, an opposing rearward edge portion 35, a first end portion 31, an opposing second end portion 32 and a medial portion 33. The body 20 is supported on spaced apart crawler track assemblies 21, 21*a*, 22. Dual crawler track assemblies 21, 21*a* are pivotally mounted to the body 20 spacedly adjacent the first end portion 31 and second end portion 32 and proximate the forward edge portion 34. The dual crawler track assemblies 21, 21*a* support the majority of the weight of the mobile sizer 19 and the spacing therebetween enhances stability. Steering rams (not shown) each having a first end portion pivotally interconnected to the body 20 and a second end portion pivotally interconnected to one dual track assembly 21, 21*a* pivot the dual track assembly 21, 21*a* about kingpin connection 49 causing the dual track assembly 21, 21*a* to “skew”. Skewing the track assemblies is also called “skid steering” and allows the mobile sizer 19 to maneuver as well as advance forwardly and rearwardly using serpentine turns. (FIGS. 9-14).

Third crawler track assembly 22 is spaced apart rearwardly from the dual crawler track assemblies 21, 21*a* to enhance stability and may be fixed or may be pivotal. In the preferred embodiment the third crawler track assembly 22 is a fixed single track assembly and is carried in yoke 53 proximate the rearward edge portion 35 of the body 20. Each crawler track assembly 21, 21*a*, 22 is powered with known drive motors and known gear assemblies (not shown). The dual track assemblies 21, 21*a* may be pivoted independently in opposing directions or pivoted in unison by actuation of steering rams. (not shown).

Figure 3:
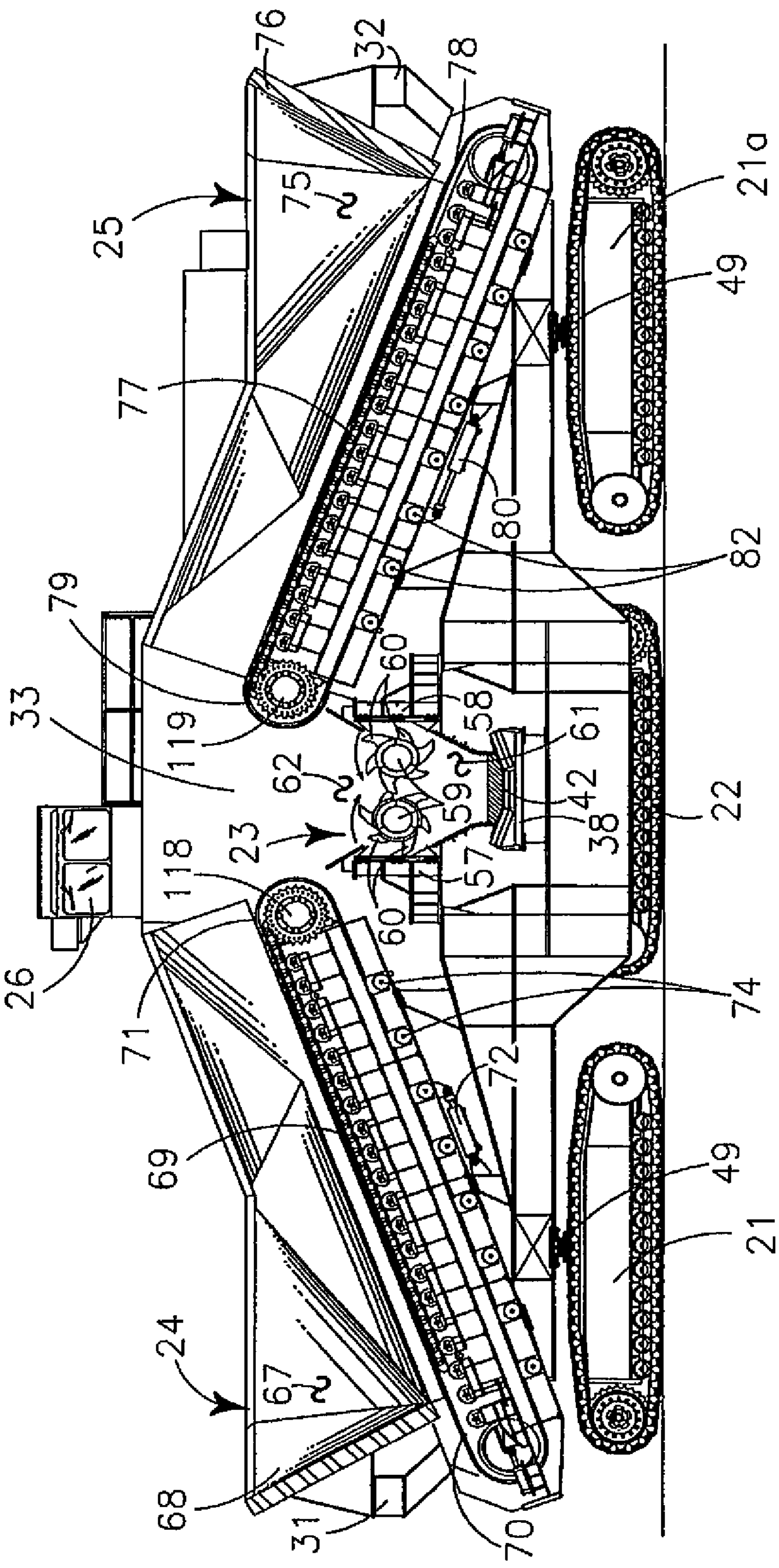

As shown in FIGS. 2 through 4, two opposing feed assemblies 24, 25 are carried by the body 20 adjacent the forward edge 34 with first feed assembly 24 proximate the first end portion 31 and second feed assembly 25 proximate the second end portion 32. Each feed assembly 24, 25 is independently operable having a feed hopper 67, 75, a drive assembly 118, 119 for powering angulated feed conveyor 69, 77 and a slide assembly 74, 82 powered by hydraulic ram 72, 80.

Feed hopper 67, 75 is proximate the first and second end portion 31, 32 respectively of the body 20 and has walls 68, 76 that flare outwardly toward open top portion to function as a funnel for material deposited therein by shovel 125 each angulated feed conveyor 69, 77 has a laterally outer first end portion 70, 78 spacedly adjacent below the proximate feed hopper 67, 75, and a second end portion 71, 79 distal from the feed hopper 69, 75 spacedly adjacent above rock crusher 23 at medial portion 33 of the body 20. Hydraulic rams 72, 80 and slide assemblies 74, 82 are operatively interconnected to move the angulated feed conveyors 69, 77 elongately relative to the feed hopper 67, 75 and the rock crusher 23. Elongate movement of either or both feed conveyors 69, 77 enables an operator to disrupt and to break dynamic material bridges (not shown) that may form above the rock crusher 23 as material is fed therein. As shown in FIG. 3, angulated feed conveyor 69 is retracted to a position distal from the rock crusher 23 by actuation of hydraulic ram 72, while angulated feed conveyor 77 is at a generally medially extended position by hydraulic ram 80.

Feed hopper 67, 75 has an open bottom spacedly above the first end portion 70, 78 of the proximate feed conveyor 69, 77 so that excavated overburden material deposited into the hopper 67, 75 is directed onto the feed conveyor 69, 77 for transport to the rock crusher 23 adjacent below the second end portion 71, 79 respectively of the feed conveyor 69, 77. The angulation of the feed conveyor 69, 77 allows the feed hopper 67, 75 to be positioned closer to supporting ground surface 110 so that the vertical height a shovel 125 needs to lift the excavated material to deposit the material in the hopper 67, 75 is reduced. Lowering the feed hopper 67, 75 increases efficiency and productivity of mining operations by reducing shovel 125 lift height which reduces shovel 125 cycle time. Having low feed hoppers 67, 75 also allows a greater variety of shovels 125 to be used with the sizer 19, such as shovels 125 that do not have large lift heights.

Rock crusher 23 is carried at medial portion 33 of the body 20 between and spacedly below second end portions 71, 79 of the feed conveyors 69, 77. Rock crusher 23 has a rectilinear frame 54 with a forward edge portion (not shown), a rearward edge portion (not shown), a first side portion 57 and a second side portion 58 and defines an open top 62 and an open bottom 61 (FIG. 3). The frame 54 supports two parallel spacedly adjacent rock crushing drums 59 that rotate on drum axles (not shown) within bearings (not shown) and bearing supports (not shown) supported by the frame 54. Each rock crushing drum 59 carries plural rock crushing teeth 60 that intermesh with the crushing teeth 60 carried by the adjacent rock crushing drum 59. Drive motors 63 and gear assemblies 64 rotate the rock crushing drums 59. Amperage load sensors (not shown) operatively interconnected to the drive motors 63 sense when the drive motors 63 are being overloaded and responsively slow the rate at which material is being fed into rock crusher 23 by reducing speed of the feed conveyors 69, 77. In the preferred embodiment the rock crushing drums 59 rotate in opposite directions so the adjacent circumferential surfaces move downwardly and the rock crushing teeth 60 are arranged on the rock crushing drums 59 in a helical pattern so that material moves to one end portion of the frame 54. Excavated material deposited into the rock crusher 23 by the feed conveyors 69, 77 is comminuted by tumbling, by rock upon rock impacts and by shearing forces generated by the rock crushing drums 59 and the rock crushing teeth 60 impacting the material.

Elongate movement of the angulated feed conveyors 69, 77 away from the rock crusher 23 by actuating hydraulic rams 72, 80 provides access to the rock crusher 23 and the rock crushing drums 59 and allows the rock crushing drums 59 to be removed from the crusher frame 54 for replacement and maintenance by lifting the drums 59 upwardly through the open top 62 and between the second end portions 71, 79 of the angulated feed conveyors 69, 77. Elongate movement of the feed conveyors 69, 77 by actuating the hydraulic rams 72, 80 further allows an operator to regulate the size of material entering the rock crusher 23.

Discharge conveyor 38 extends rearwardly under the body 20 and has a first end portion 39 spacedly below the open bottom 61 of the rock crusher 23 and a second end portion 40 extending outward from the rearward edge portion 35 of the body 20 proximate above the third track assembly 22. Comminuted material exiting open bottom 61 of the rock crusher 23 is deposited on discharge conveyor belt 42 proximate the first end portion 39 of the discharge conveyor 38 and is transported rearwardly thereon under the body 20 to the second end portion 40 where the comminuted material is deposited onto telescoping conveyor 27.

As shown in FIGS. 1, 6 and 7 the telescoping conveyor 27 has a first end portion 83 proximate the rearward edge portion 35 of the mobile sizer 19, a second end portion 84 distal from the mobile sizer 19 and a drive assembly 88 powering an endless belt 87 for transporting the comminuted material therebetween. Primary outer frame 85 carries secondary inner frame 86 that is axially movable relative to the primary outer frame 85 on cooperating extension rails 92, 93 so that the telescoping conveyor 27 may axially expand and contract as the mobile sizer 19 moves. (FIGS. 6, 7).

Support arm 41 extending rearwardly from rearward edge 35 of the body 20 pivotally supports dorsal attachment arm 90 carried by first end portion 83 of the telescoping conveyor 27. Ball joint 91 provides a movable interconnection between the support arm 41 and the dorsal attachment arm 90 so that the telescoping conveyor 27 and the mobile sizer 19 remain operatively interconnected as the mobile sizer 19 moves and the telescoping conveyor 27 extends and contracts. First end portion 83 of the telescoping conveyor 27 is carried spacedly adjacent below the second end portion 40 of the discharge conveyor 38 to receive comminuted material therefrom.

Second end portion 84 of the telescoping conveyor 27 (FIGS. 6, 7) is operatively connected to mobile hopper 28 which is carried by mobile bridge conveyor 29 spacedly above the supporting ground surface 110. Roller table 99 and pivoting connection 94 provide a movable interconnection between the second end portion 84 of the telescoping conveyor 27 and the mobile hopper 28 and accommodate limited movement therebetween while maintaining the continuously operative interconnection. Axial extension and contraction of the telescoping conveyor 27 is managed by the control system 30 response to input from sensors (not shown) carried by the roller table 99. When the sensors (not shown) detect the second end portion 84 of the telescoping conveyor 27 is at risk of moving out of pre-determined operating parameters (not shown), the sensors initiate a signal (not shown) that is communicated to the control system 30. The control system 30 responsively actuates motors (not shown) interconnected with the telescoping conveyor 27 causing the secondary frame 86 to move axially inwardly or axially outwardly relative to the primary frame 85 to re-establish positioning of the second end portion 84 within the acceptable operating range on the roller table 99. Material deposited onto first end portion 83 of the telescoping conveyor 27 from the discharge conveyor 38 is carried by the endless belt 87 to the second end portion 84 where the material is deposited into open top input orifice (not shown) of the mobile hopper 28.

Probably best shown in FIG. 8, the bridge conveyor 29 is an elongate mobile frame structure that carries the mobile hopper 28 on elongate spaced apart rails 100 spacedly above an endless belt conveyor 105 that communicates with other conveyors (not shown) and ultimately with a spoil pile (not shown) where the excavated and comminuted material is deposited, distal from the mine face 131. The bridge conveyor 29 is movable on a plural spaced apart parallel crawler track assemblies 101 that have known drive motors (not shown) and known gear assemblies (not shown) that power endless link tracks 103. The bridge conveyor 29 moves responsive to signals (not shown) from the control system 30 in a path generally perpendicular to the serpentine travel of the mobile sizer 19 while maintaining a continuous operative interconnection between the second end portion 84 of the telescoping conveyor 27 and the mobile hopper 28 supported on rails 100 above the endless conveyor 105.

Operator cab 26 is carried by the body 20 rearward of rock crusher 23. An operator within the operator cab 26 monitors functions and movements of the mobile sizer 19, the angulated feed conveyors 69, 77, the rock crusher 23, the telescoping conveyor 27 and the bridge conveyor 29. Control system 30 which may be monitored and managed by the operator within the operator cab 26 uses global positioning satellite (GPS) technology and a plurality of sensors (not shown), such as proximity sensors and load sensors arrayed about the mobile sizer 19, the telescoping conveyor 27, the mobile hopper 28, the bridge conveyor 29 and the endless conveyor 105 to monitor the system operations and functions, to adjust operations and functions and control and direct movement of the mobile sizer 19, telescoping conveyor 27, bridge conveyor 29 and endless conveyor 105. The control system 30 maintains the continuous operative interconnection between the mobile sizer 19, the telescoping conveyor 27 and the bridge conveyor 29 and causes the components to move independently and cooperatively to maintain the operative interconnection as the mobile sizer 19 moves and advances with the shovels 130 as the mine face 131 is excavated. The control system 30 may operate autonomously by means of computers and the like or may be overridden for manual operation if desired.

As shown in FIG. 15, which is a flowchart, the control system 30 receives input signals 121 from the operator 109, from GPS receivers 111 and from sensors 112, 113, 114, 115, 116, 117 spacedly arrayed about the mobile sizer 19, the telescoping conveyor 27, the mobile hopper 28, the roller table 99, the bridge conveyor 29 and the rock crusher 23. The control system 30 processes the input signals 121 and compares 123 the input signals 121 to desired operating parameters 122. When the input signals 121 correspond 124 with the operating parameters 122 no control system 30 output signal is necessary or generated. When the comparison 123 of the input signals 121 are outside 128 the operating parameters 122 the control system 30 generates a new output signals 129 that are communicated, via known means, to motors, gears, pumps and the like about the mobile sizer 19, the telescoping conveyor 27, the mobile hopper 28, the bridge conveyor 29 and the rock crusher 23 to reestablish operation within the operating parameters 122.

Manual override 130 allows an operator to interrupt and override the control system 30 and manually generate 132 output signals that that are communicated, via known means, to motors, gears, pumps and the like about the mobile sizer 19, the telescoping conveyor 27, the mobile hopper 28 the bridge conveyor 29 and the rock crusher 23 to reestablish operation within the operating parameters 122 or as otherwise necessary to maintain desired operation and for movement. Likewise, coordinated movement of the crawler assemblies 21, 21*a*, 22, the telescoping conveyor 27, the mobile hopper 28 and the bridge conveyor 29 is maintained by spacedly arrayed GPS receivers 111 which thereupon communicate with the control system 30 which receives and processes the input signals 121 and compares 123 the input signals 121 to the operating parameters 122.

Optional rock breaker 120 is hydraulically operated and is pivotally carried proximate the open top 62 of the rock crusher 23. Rock breaker 120 is employed when the rock crusher 23 becomes blocked, such as by a rock that is too big to be comminuted, or to break a dynamic material bridge that cannot be disrupted by moving the angulated feed conveyors 69, 77 elongately inwardly and outwardly. A work deck 37 (FIG. 4) having flights of stairs 37*a* provides a walking surface about the mobile sizer 19 and feed assemblies 24, 25 for operators and for maintenance.

Having described the structure of my overburden removal system with triple track mobile sizer, its operation may be understood.

After an ore deposit has been identified as economically viable, earth moving equipment is used to initiate the excavation which involves removing sufficient topsoil and overburden material so that an angulated earthen ramp communicates from the surface level, down to a subsurface level where the ore is accessible.

Commonly the mobile sizer 19, the telescoping conveyor 27, the mobile hopper 28, the bridge conveyor 29 and the endless conveyor 105 are transported to the mine site in pieces and are assembled on site.

As shown in FIG. 8 mobile sizer 19 is positioned proximate a shovel 125 and a mine face 131 being excavated. Plural mobile sizers 19 may operate in unison to excavate the same mine face 131. The mobile sizer 19 is interconnected to telescoping conveyor 27 which communicates with the mobile hopper 28 supported by bridge conveyor 29. The bridge conveyor 29 operatively communicates with endless conveyor 105 for transporting excavated and comminuted material to a spoil site. (not shown)

Known mining techniques allow removal of soil levels independently, through such methods as cast blasting. For instance, to remove the fertile topsoil level, the topsoil level may be drilled with a predetermined pattern of holes, and the holes filled with explosives. Controlled detonation of the explosives causes the topsoil layer to be cast in a desired direction and to slough off the mine face 131 so that the topsoil is accessible to the shovel 125 for excavation and transfer to the mobile sizer 19. Movement of the endless conveyor 105, and more particularly a terminal end portion of the endless conveyor 105 distal from the mobile sizer 19, allows the topsoil to be segregated at a desired location separate from the other layers of overburden that are subsequently excavated. Segregation of the topsoil is one method to enhance the efficiency and effectiveness of mine site reclamation.

Shovel 125 pivots about its vertical axis (not shown) so that bucket 126 may excavate material from the mine face 131, which may be, without limitation, topsoil, overburden, ore or the like. Once the bucket 126 is filled with material, the shovel 125 lifts the bucket 126 and pivots about its vertical axis so that the bucket 126 is positioned above a feed hopper 67, 75 of a feed assembly 24, 25. The shovel 125 empties the material from within the bucket 126 into the feed hopper 67, 75, and then pivots about its vertical axis back to the mine face 131 to excavate another bucket 126 of material, thus completing a shovel cycle.

Feed hopper walls 68, 76 act as an upwardly opening funnel directing the excavated material onto angulated feed conveyor 69, 77. Feed conveyor 69, 77 transports the material inwardly and upwardly to the second end portion 71, 79 and deposits the material into open top 62 of the rock crusher 23. The oppositely rotating rock crushing drums 59 and rock crushing teeth 60 thereon comminute the material by means of rock upon rock impacts, tumbling, and shearing forces. Once the material is reduced to a size passable through space 65 defined between the rock crushing drums 59 and rock crushing teeth 60, the material is deposited onto discharge conveyor 38. The discharge conveyor 38 transports the material transversely under the sizer 19 to the first end portion 83 of the telescoping conveyor 27. Scales (not shown) operatively interconnected to the discharge conveyor 38 weigh the comminuted material passing thereon to record production.

Endless belt 87 of the telescoping conveyor 27 transports the material from the first end portion 83 to the second end portion 84 which is pivotally supported above input orifice (not shown) of the mobile hopper 28. Material passing over the second end portion 84 is deposited into the input orifice (not shown) which functions as an upwardly opening funnel, directing the material therein out though a discharge orifice (not shown) onto the endless belt conveyor 105 for transport to the spoil site.

As the shovel 125 continues excavating material, the mine face 131 advances forwardly. Over repeated shovel cycles the distance between the shovel 125 and the mobile sizer 19 increases so that the shovel 125 is no longer able to pivot about its vertical axis and reach both the mine face 131 and a feed hopper 67, 75 with the bucket 126. At such time it is necessary to move the mobile sizer 19 which may be accomplished by actuating the crawler track assemblies 21, 21*a*, 22 to move the mobile sizer 19 laterally. Lateral movement may necessitate extension or contraction of the telescoping conveyor 27 which is managed by control system 30. When lateral movement of the mobile sizer 19 is insufficient to move the mobile sizer 19 sufficiently close to the mine face 131 and shovel 125, the mobile sizer 19 may be advanced forwardly using repeated serpentine turns. (FIGS. 9-14).

The control system 30, or the operator (not shown) actuates steering rams (not shown) skewing first dual crawler track assembly 21 in a first direction relative to the body 20 and skewing second dual crawler track assembly 21*a* in the opposing direction relative to the body 20. (when viewed from above).

As shown in FIG. 10, the control system 30 actuates the crawler track assemblies 21, 21*a*, 22 causing the mobile sizer 19 to move laterally along path of travel 108 initiating a first half of a serpentine turn. As the sizer 19 moves, telescoping conveyor 27 may axially expand or contract as necessary to maintain the continuous operative interconnection between the mobile sizer 19 and the mobile hopper 28. Bridge conveyor 29 may also move on crawler track assembly 101 responsive to output signals 129 from the control system 30. The control system 30 ensures the interconnection between the components remains continuously operational.

As shown in FIG. 11, the control system 30 actuates steering rams (not shown) skewing first dual track assembly 21 in a second direction and skewing second dual crawler track assembly 21*a* opposite the first dual track assembly 21.

As shown in FIG. 12, the control system 30 actuates the crawler track assemblies 21, 21*a*, 22 causing the mobile sizer 19 to move laterally completing second half of a serpentine turn.

As shown in FIG. 13, the control system 30 actuates steering rams (not shown) causing the first dual track assembly 21 and second dual track assembly 21*a* to skew to an orientation parallel with the third crawler track assembly 22.

As shown in FIG. 14, upon completion of the first half and second half of the serpentine turn, the mobile sizer 19 has advanced forwardly approximately 6 meters from position 106 to position 107 along path of travel 108 and the feed hoppers 67, 75 are again within reach of the shovel 125 without requiring the shovel 125 to move other than by pivoting. Bridge conveyor 29 is likewise moved upon crawler track assemblies 101 by the operating system 30 to accommodate the new position of the mobile sizer 19. During the course of the movement and execution of the serpentine turns the mobile sizer 19 and system for overburden removal remains fully operational and overburden removal continues.

Having thusly described my invention, what I desire to protect by Letters Patent:

What I claimed is:

1. A system for receiving excavated material at a mine, for comminuting the material and for transporting the material to another site, the system comprising in combination:

(a) a mobile sizer having
  (i) a body supported on three spaced apart crawler track assemblies, with at least two of said assemblies being pivotal and capable of providing serpentine movement to the mobile sizer;
  (ii) a feed assembly having a feed hopper for receiving the excavated material and a feed conveyor to transport the material from the feed hopper to a rock crusher spaced apart from the feed hopper; and
  (iii) a discharge conveyor having a first end portion below the rock crusher and a second end portion spacedly outward of the body;

(b) a telescoping conveyor for receiving material from the discharge conveyor, the telescoping conveyor having a first end portion movably attached to the body proximate the second end portion of the discharge conveyor, and a second end portion distal from the body operatively interconnected to a mobile hopper;

(c) a mobile bridge conveyor carrying the mobile hopper and operatively communicating with a conveyor system for transporting the material to a distal site; and (d) a control system operatively interconnected to the mobile sizer, the discharge conveyor, the telescoping conveyor, the mobile hopper, the bridge conveyor and the conveyor system to monitor and control functions and maintain a continuously operative interconnection therebetween for movement of the material while stationary and while moving, and for actuating the crawler track assemblies and for pivoting the pivotal crawler track assemblies in a first direction for movement through first half of a serpentine turn and for pivoting the pivotal crawler track assemblies in a second direction for movement through second half of a serpentine turn to advance the mobile sizer in a direction perpendicular to the elongate length of the body.

2. The system of claim 1 further comprising:

means to move the feed conveyor elongately within the feed assembly.

3. The system of claim 1 wherein:

the feed conveyor is inclined from the feed hopper to the rock crusher to position the feed hopper in closer proximity to supporting ground surface.

4. The system of claim 1 further comprising:

plural rotatable rock crushing drums within the rock crusher, each rock crushing drum having a plurality of rock crushing teeth.

5. The system of claim 1 further comprising:

two oppositely rotatable rock crushing drums within the rock crusher, each rock crushing drum having a plurality of rock crushing teeth.

6. The system of claim 1 further comprising:

a manual override for the control system for an operator to control and operate the system.

7. The system of claim 1 wherein:

the control system uses Global Positioning System location information to direct movement of the mobile sizer, the telescoping conveyor, the bridge conveyor and the conveyor system to maintain the continuous operative interconnection therebetween.

8. The system of claim 1 wherein:

the body is supported on two laterally spaced dual pivotal crawler track assemblies and at least one rearwardly spaced crawler track assembly.

9. The system of claim 1 further comprising:

a roller table interconnecting the second end portion of the telescoping conveyor and the mobile hopper, and plural sensors operatively interconnected to the roller table and to the control system maintain moveable interconnection of the second end portion of the telescoping conveyor and the mobile hopper within operating parameters and tolerances.

10. The system of claim 1 wherein:

the telescoping conveyor has a secondary frame axially movable within a primary frame allowing the telescoping conveyor to expand and contract axially as the mobile sizer moves and as the mobile hopper moves relative to the bridge conveyor.

11. A system for receiving excavated material from a shovel at an open pit mine, for comminuting the material and for transporting the material to another site, the system comprising in combination:

(a) a mobile sizer having (i) a body with first and second end portions, a forward edge portion and a rearward edge portion, the body supported on two spaced apart dual pivotal crawler track assemblies proximate the forward edge portion capable of providing serpentine movement to the mobile sizer and at least one single crawler track assembly proximate the rearward edge portion;

(ii) a feed assembly having a feed hopper at an end portion proximate the forward edge for receiving excavated material from the shovel and an elongately moveable feed conveyor to transport the material from the feed hopper to a rock crusher spacedly below end portion of the feed conveyor distal from the feed hopper, the rock crusher having an open top and an open bottom; and (iii) a discharge conveyor having a first end portion spacedly below the open bottom of the rock crusher and a second end portion spacedly outward the body;

(b) a telescoping conveyor for receiving material from the second end portion of the discharge conveyor, the telescoping conveyor having a first end portion spacedly below the second end portion of the discharge conveyor pivotally attached to the body by means of a ball joint, and having a second end portion operatively interconnected to a roller table carried by mobile hopper distal from the body;

(c) a bridge conveyor having at least one crawler track assembly for movement carrying the mobile hopper and second end portion of the telescoping conveyor, the bridge conveyor operatively communicating with a conveyor system for transporting the material to a location distal from the mobile sizer; and (d) a control system operatively interconnected to the mobile sizer, the discharge conveyor, the telescoping conveyor, the mobile hopper, the bridge conveyor and the conveyor system to monitor and control functions and maintain a continuously operative interconnection therebetween while stationary and while moving, and for actuating the crawler track assemblies and for pivoting the pivotal crawler track assemblies in a first direction for movement through first half of a serpentine turn and for pivoting the pivotal crawler track assemblies in a second direction for movement through second half of a serpentine turn to advance the mobile sizer in a direction perpendicular to elongate length of the body, and (e) a manual over ride for the control system for an operator to optionally operate the system with manual controls.

* * * * *